United States Patent [19]
Takaoka et al.

[11] 3,920,440
[45] Nov. 18, 1975

[54] METHOD FOR PROTECTING PLANTS AGAINST OXIDANT INJURY

[75] Inventors: Ichiro Takaoka; Michio Fukuda; Takuro Kisaki; Hiroshi Kitano; Akira Koiwai; Toshikiyo Shinohara; Kiyotomo Araiba; Toshiaki Kitamura; Yoshitada Yamamoto, all of Kurashiki, Japan

[73] Assignees: Takasago Perfumery Co., Ltd.; The Japan Tabacco & Salt Public Corporation, both of Tokyo, Japan

[22] Filed: Aug. 9, 1973

[21] Appl. No.: 386,892

[30] Foreign Application Priority Data
Aug. 15, 1972  Japan ............................... 47-81162

[52] U.S. Cl. .................................... 71/88; 71/94
[51] Int. Cl.$^2$ .......................................... A01N 9/24
[58] Field of Search ................................ 71/88, 78

Primary Examiner—Lewis Gotts
Assistant Examiner—Catherine L. Mills
Attorney, Agent, or Firm—Sughrue, Rothwell, Mion, Zinn & Macpeak

[57] ABSTRACT

A method for protecting plants against oxidant injury comprising topically applying one or more compounds containing a methylenedioxyphenyl radical.

3 Claims, No Drawings

METHOD FOR PROTECTING PLANTS AGAINST OXIDANT INJURY

BACKGROUND OF THE INVENTION

1. Field of the Invention

The present invention relates to a method for protecting plants against oxidant injury.

2. Description of the Prior Art

With the development of industry and due to increasing exhaust gases as a result of an expanding number of automobiles, air pollution recently has prevailed over the world. Air pollution causes injury to cultivated plants which becomes more severe year by year. It is particularly remarkable that agricultural and horticultural cultivated plants, trees, etc. are injured by oxidants which are a portion of air pollutants. As protecting agents against oxidant injury in plants, antioxidants; benomyl agents (M. Pellissier, N. L. Lacassee, et al.: Journal of the Air Polution Control Association, 22, No. 9, 722 – 725 (1972)); diphenylamines, quinones, thiocarbamates (S. Rich and G. S. Tayler: Science 132, 150 – 151 (1960)); plant hormones such as kinetin and benzyladenine are known. However, they have various practical disadvantages in that they show low protecting effects, result in colored deposits, give rise to toxic effects to man and animals, adversely affect the physiological functions of plants, etc.

SUMMARY OF THE INVENTION

An object of this invention is to protect plants from injury by oxidants.

Another object of this invention is to provide a protective agent against oxidant injury in plants which can be produced from easily available industrial chemicals.

A further object of this invention is to provide a safe protective agent against oxidant injury in plants which is not toxic to man and animals and does not cause damage to plants.

These and other objects of this invention will be more clearly understood referring to the following detailed description and examples.

The inventors have studied many compounds for protecting plants from injury by oxidants, as a result, have found that agents containing as an active ingredient compounds having a methylenedioxyphenyl radical are effective for protecting plants from injury by oxidants.

The compounds having a methylenedioxyphenyl group according to this invention exhibit potent protecting effects against oxidant injury in plant when previously sprayed on the plants in the form of an emulsion or a suspension of a wettable powder. Moreover, these compounds have no acute toxicity and neither give rise to toxic effects to man and animals nor injury to plants.

DETAILED DESCRIPTION OF THE INVENTION

Compounds having methylenedioxyphenyl radical are those having the radical

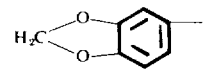

in their structural formula and include, for example, sesamin, sesamolin, piperine, piperonyl butoxide, sesamex, sulfoxide, propyl isome, safroxan, piperonyl cyclonene, methylenedioxycinnamic acid, halfsesamin, piperonal and methylenedioxy phthalaldehyde. These compounds are those which are found in natural products or produced as a synergist for insecticides, perfumes and industrial chemicals, which can be used for the purposes of this invention without adversely affecting man and animals as well as plants. That is, sesamin (p. 943) (The numerals in parenthese indicate pages of The Merck Index 8th Edition in which the compounds are described.) and sesamolin (p. 944) are found in a sesame oil, piperine (p. 838) is found in black pepper and piperonyl butoxide (p. 839), sesamex (p. 943), sulfoxide (p. 1004), propyl isome, safroxan, piperonyl cyclonene, etc. are known as synergists for insecticides. In the following Table 1, compounds containing a methylenedioxyphenyl radical are tabulated along with their chemical structural formulas and properties.

Table 1

| | Compound | Structural Formula | Property |
|---|---|---|---|
| 1 | Piperonyl Butoxide | 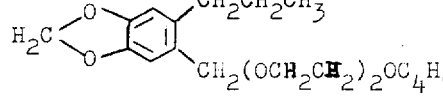 | Light brown oil |
| 2 | Safroxan | 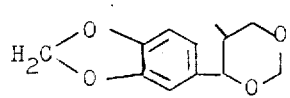 | White solid |
| 3 | Sesamolin | 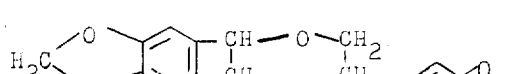 | White solid |
| 4 | Piperonyl Cyclonene | 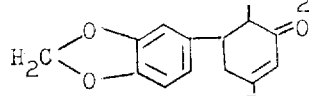 | Red oily liquid |

Table 1 —Continued

| Compound | | Structural Formula | Property |
|---|---|---|---|
| 5 | Sesamex | H₂C(O)(O)C₆H₃(CH₃)—O—CH—(OCH₂CH₂)₂OCH₂CH₃ | Yellow oily liquid |
| 6 | Sesamin | (structure: bis-methylenedioxyphenyl furofuran) | White solid |
| 7 | Sulfoxide | H₂C(O)(O)C₆H₃—CH₂—CH(CH₃)—S(O)—(CH₂)₇CH₃ | White oily liquid |
| 8 | Propyl Isome | H₂C(O)(O)C₆H₂—tetralin with COOC₃H₇, COOC₃H₇, CH₃ | White Orange oily liquid |
| 9 | Piperine | H₂C(O)(O)C₆H₃—CH=CHCH=CH—C(O)—N(piperidine) | White solid |
| 10 | Methylenedioxy Cinnamic Acid | H₂C(O)(O)C₆H₃—CH₂—CH=CH—COOH | White solid |
| 11 | Halfsesamin | H₂C(O)(O)C₆H₃—(tetrahydrofuran) | Yellow oily liquid |
| 12 | Piperonal | H₂C(O)(O)C₆H₃—CHO | White solid |
| 13 | Methylenedioxy Phthalaldehyde | H₂C(O)(O)C₆H₂(CHO)(CHO) | Light yellow solid |

These compounds show an potent protecting effect on plants from injury caused by oxidants, when previously sprayed in the form of an emulsion or a suspension containing about 0.01 to 1.0% preferably about 0.05 to 0.2% by weight of one or more of these compounds.

In the preparation of the protective agent against oxidant injury according to this invention, the compounds shown in Table 1 may previously be in the form of an emulsifiable concentrate prepared in an appropriate solvent containing adequate surface-active agent (0.5 to 5%) and dispersing agent (0 to 5%) and then used by diluting, while stirring, with water. In the case of compounds which are solid at normal temperatures, they are advantageously in the form of a wettable powder prepared by powdering with a carrier (30 to 80%) and an dispersing agent (0 to 10%) and then used by diluting with water.

As solvents, surface-active agents and spreaders, the following compounds are suitable.

Solvents: mixtures of aliphatic or alicyclic hydrocarbons and alcohols; aromatic hydrocarbons such as benzene, toluene and xylene; ethers such as propyl ether and dioxane; ketones such as acetone, methyl ethyl ketone and acetophenone; esters such as tributyl phosphate, triethyl phosphate, ethyl acetate, amyl acetate, benzyl acetate and methyl phthalate; alcohols and glycols such as ethyl alcohol, isopropyl alcohol, n-butyl alcohol, n-hexanol, ethylene glycol, 2-ethyl-1,8-hexanediol, cyclohexanol, benzyl alcohol and propylene glycol; ether alcohols such as methyl cellosolve, butyl cellosolve, diethyleneglycol monoethylether and diethyleneglycol monobutylether; dimethylformamide, dimethylacetamide, etc.

Surface-active agents: polyoxyethylene higher alcohol ethers, polyoxyethylene alkyl aryl ethers, polyoxyethylene fatty acid esters, fatty acid monoglycerides, fatty acid glycol esters, polyoxyethylene sorbitol fatty acid esters, polyoxyethylene fatty acid amides and amines, polyoxyethylene phosphoric acid alkyl ethers, polyoxyethylene phosphoric acid alkyl esters, polyoxyethylene phosphoric acid alkyl aryl ethers, polyoxyethylene phosphoric acid alkyl aryl esters, sulfonated oils, sulfone compounds and their esters, invert soaps, etc.

In the above described surface-active agents, the degree of polymerization of the polyoxyethylene group generally used is about 10. Suitable alkyl aryl groups are generally nonyl phenyl or octyl phenyl. Higher alcohols generally employed are the $C_8$ and $C_9$ alcohols and the fatty acids generally are the $C_{12}$ to $C_{18}$ fatty acids, the number of carbon atoms in the alkylphosphoric acid esters is generally 8 to 9.

Dispersing agents: ligninsulfonates, fatty acid ethyl esters, abietic ester, alkylnaphthalenesulfonates, alkylbenzensulfonates etc.

The following specific examples of the preparation of this protective agent against oxidant injury in plants will be illustrated using the compounds described above. Unless otherwise indicated all parts and percents are by weight.

A. Preparation examples of compounds which are liquid at normal temperature

Preparation Example 1

Sesamex is diluted while stirring with water containing 0.1% of Tween 20 (a polyoxyethylenesorbitanemonolaurate produced by Atlas Co., Ltd.) to produce an emulsion containing 0.2% of sesamex.

Preparation Example 2

| Piperonyl Butoxide | 30% |
| Ethyl Alcohol | 60% |
| Polyoxyethylene Nonyl Phenyl Ether | 10% |

These are diluted with water while stirring to produce an emulsion containing 0.05 to 1.0% of piperonyl butoxide.

Preparation Example 3

| Piperonyl Butoxide | 20% |
| Diacetone Alcohol | 30% |
| Sorpol (Toho Chemical Ind. Co., Ltd. Japan) | 1.0% |
| Xylol | 15% |
| Ethanol | 29% |
| Water | 5% |

In applying, these are diluted with water to a 1/50 to 1/500 concentration while stirring to produce an emulsifiable concentrate. It is quite rapidly dispersed uniformly in water and shows a uniform effect.

B. Preparation examples of compounds which are solid at normal temperature

Preparation Example 4

| Safroxan | 50% |
| Dibutylnaphthalene sulfonic acid-Na | 10% |
| Bentonite | 40% |

The wettable powder is diluted to a 1/100 to 1/1000 concentration with water while stirring to produce a suspension.

Preparation Example 5

30 parts of piperine is dissolved in 60 parts of benzene, added with 10 parts of Tween 20 and diluted with water to the concentration of 0.05 to 1% while stirring to produce an emulsion.

The following application examples will be given for demonstrating the effect of the protective agents according to this invention.

Application Example 1

Tobacco plants (Nicotiana tabacum L. Var. Hicks-2) were cultivated in clay pots, 12 cm in diameter, and treated with the protective agents of this invention at the time when the plants with about 23 leaves were at the onset of flowering.

10 ml of piperonyl butoxide was first dissolved into 20 ml of ethyl alcohol and then diluted while stirring with water containing 0.1% Tween 20 to the designated concentration of piperonyl butoxide.

The above emulsion was sprayed on plants in such an amount that both surfaces of the leaves were sufficiently wetted.

5 days after treating, the plants were placed in a plant fumigation chamber (80 × 90 × 100 cm) available from Toyo Rika Instrument Inc. which can automatically control the temperature, humidity, illumination and amount of oxidant generated. Thus, they were exposed to air containing 30 pphm (parts per hundred million) oxidant under the conditions of an illumination of 20,000 lux and a temperature of 20°C for 2 hours and then placed into a greenhouse at 15°C. After 48 hours, the degree of damage was evaluated for 5 individual leaves (15th to 19th leaf from the cotyledons). The results obtained are shown in the following Table 2. Under natural conditions, the oxidant injury in cultivated plants in the field occurs at about 10 pphm of oxidant concentration. In this test, more severe conditions (higher concentration of oxidant) were applied in comparison with naturally occurring conditions.

Each of items shown in Table 2 were evaluated in accordance with the following: (The following system is also applicable to Tables 3 and 4.)

Degree of Injury
  0: No damage at all
  1: Damage to less than 20% of the leaf surface area
  2: Damage of 20 to 40% of the leaf surface area
  3: Damage of 40 to 60% in leaf surface area
  4: Damage of 60 to 80% in leaf surface area
  5: Damage of 80 to 100% in leaf surface area $$\text{Injury Index} = \frac{\epsilon \text{ Degree of Injury}}{\text{Number of Leaves Evaluated}}$$

$$\text{Protection rate} = (100) \frac{\text{Injury Index for Untreated Plants} - \text{Injury Index for Treated Plants}}{\text{Injury Index for Untreated Plants}}$$

Table 2

| Conc. of Piperonyl Butoxide in the Emulsion | Degree of Injury (1) | | | | | Injury Index | Protection Rate (%) |
|---|---|---|---|---|---|---|---|
| | 15 | 16 | 17 | 18 | 19th leaf from the Cotyledons | | |
| Spraying 0.1% Emulsion: | | | | | | | |
| untreated | 1 | 1 | 3 | 4 | 4 | 2.6 | — |
| treated | 0 | 0 | 0 | 0 | 1 | 0.2 | 92 |
| Spraying 0.2% Emulsion: | | | | | | | |
| untreated | 1 | 2 | 3 | 4 | 4 | 2.8 | — |
| treated | 0 | 0 | 0 | 1 | 0 | 0.2 | 93 |
| Spraying 1% Emulsion: | | | | | | | |
| untreated | 1 | 2 | 4 | 4 | 3 | 2.8 | — |
| treated | 0 | 0 | 0 | 0 | 1 | 0.2 | 93 |

(1) These leaves were the most susceptible to injury by oxidant and were the most suitable to evaluate the protecting activity of the agent due to their appropriate size and physiological condition.

From the results shown in Table 2, the protective effect of piperonyl butoxide against oxidant injury can be seen very significantly in spraying the emulsifiable concentrate thereof diluted to the lowest concentration (0.1%) tested.

Application Example 2

Tobacco plants (variety: Bel w-3) which have an extremely low tolerance for oxidant injury were treated with an emulsion containing 0.2% of piperonyl butoxide diluted to 1/500 concentration in about the same manner as in the application test 1. 0, 1, 3, 7, 14 and 21 days after the spraying, the plants were exposed to air containing 30 pphm oxidant concentration under the condition of an illumination of 20,000 lux illumination and a temperature of 20°C for 2 hours, and then placed in a greenhouse at 15°C. After 48 hours, the degree of Injury was evaluated. The results obtained are shown in the following Table 3.

Table 3

| Days after Treatment | | Degree of Injury | | | | | Injury Index | Protection Rate (%) |
|---|---|---|---|---|---|---|---|---|
| | | 15 | 16 | 17 | 18 | 19th leaf from the Cotyledon | | |
| 0 | untreated | 3 | 3 | 4 | 4 | 2 | 3.3 | — |
| | treated | 2 | 3 | 4 | 3 | 3 | 3.0 | 0.1 |
| 3 | untreated | 2 | 3 | 4 | 3 | 3 | 3.0 | — |
| | treated | 0 | 0 | 0 | 1 | 1 | 0.4 | 86.7 |
| 7 | untreated | 2 | 3 | 3 | 4 | 2 | 2.8 | — |
| | treated | 0 | 1 | 1 | 2 | 0 | 0.8 | 71.4 |
| 14 | untreated | 2 | 2 | 4 | 3 | 3 | 2.8 | — |
| | treated | 0 | 2 | 3 | 2 | 2 | 1.8 | 35.7 |

From the results shown in the Table 3, it is noted that the protective effect against oxidant injury of the protective agent according to this invention continues for a considerable period of time of more than about 14 days after spraying.

Application Example 3

The preparation prepared according to the above preparation Example 3 was diluted to a piperonyl butoxide concentration of 0.2%. The following Table 4 shows the results of the protective effect against weather fleck which is an oxidant injury in tobacco plants in the field under natural conditions in a tobacco-producing district of Okayama Prefecture in Japan.

Table 4

| Testing No. | Treatment | Time of Testing (days after blooming) | Time of Observation (days after treatment) | Injury Index | Protection Rate (%) |
|---|---|---|---|---|---|
| 1 | untreated | 5 | 5 | 5.2 | — |
| | treated | " | " | 0.2 | 96 |
| 2 | untreated | 1 | 2 | 6.5 | — |
| | treated | " | " | 0.7 | 89 |
| 3 | untreated | 2 | 3 | 11.9 | — |
| | treated | " | " | 2.8 | 76 |

Note 1: Tobacco plant used — N. Tabacum L. Var. Hicks-2.
Note 2: Observation is made for 5 leaves of 15th – 19th leaf from the cotyledon. Therefore, the expression of Injury Index is the same as in Application Test 1.

From the results shown in Table 4, it is noted that the protective agent of this invention shows a protective effect against weather flecks in tobacco plants.

Application Test 4

Tobacco plants were cultivated in the same manner as in the above Application Example 1 and then sprayed with 0.2% solutions of compounds 2- 8 shown in the Table 1 prepared in the same way as in the above Application Example 1. 3 days after the treatment, the plants were exposed to air containing 20 pphm oxidant under the condition of an illumination of 20,000 lux and a temperature of 20°C for 2 hours and then placed in a greenhouse at 15°C. After 48 hours, the degree of damage was observed. The results obtained are shown in the following Table 5.

Table 5

| Compound | Degree of Injury | | | | | Injury Index |
|---|---|---|---|---|---|---|
| | 15 | 16 | 17 | 18 | 19th leaf | |
| Safroxan (2) | 0 | 0 | 1 | 0 | 0 | 0.2 |
| Sesamolin (3) | 0 | 1 | 1 | 0 | 0 | 0.4 |
| Piperonyl Cyclonene (4) | 0 | 1 | 0 | 0 | 0 | 0.2 |
| Sesamex (5) | 0 | 0 | 0 | 1 | 1 | 0.4 |
| Sesamin (6) | 0 | 0 | 0 | 1 | 0 | 0.2 |
| Sulfoxide (7) | 0 | 1 | 1 | 0 | 0 | 0.4 |
| n-Propyl Isome (8) | 0 | 1 | 0 | 0 | 0 | 0.2 |
| Piperine (9) | 0 | 1 | 0 | 0 | 0 | 0.2 |
| Methylenedioxy Cinnamic acid (10) | 0 | 1 | 0 | 0 | 1 | 0.4 |
| Halfsesamin (11) | 0 | 1 | 1 | 1 | 0 | 0.6 |
| Piperonal (12) | 0 | 1 | 1 | 0 | 0 | 0.4 |
| Methylenedioxy Phthaladehyde (13) | 0 | 1 | 1 | 0 | 0 | 0.4 |
| Untreated | 2 | 1 | 3 | 4 | 4 | 2.6 |

Application Example 5

Tobacco (*Nicotiana tabacum L.*), tomato (*Lycopersicum esculentum MILL*), egg-plant (*Solanum mologena L.*), Kidney bean (*Phaseolus vulgaris L.*), alfalfa (*Medicago saliva L.*), garden balsam (*Impatiens balsamina L.*) and sage (*Salvia officinalis L.*) were cultivated in a greenhouse in the same manner as described in the above application Example 1 and tested 50 days after seeding. Rose (Rosa spp) which is 3 years old after cutting and peach (*Prunus persica sieb, et Zncc.*), Japanese cherry (*Prunus Yedoensis Matsum.*), grape vine (*Vitis vinifera L.*) and plane tree (*Platanus orientalis L.*) which appear to be more than 3 to 5 years old were used, and branches with leaves were cut therefrom and put in beakers filled with distilled water for testing.

Compounds 1 – 8 are prepared in the same way as in the above Application Example 1 and sprayed on both surfaces of leaves of the respective plants. 3 days after the treatment, the plants were exposed to air containing 30 pphm oxidant under the condition of an illumination 20,000 luxx of and a temperature of 20°C for 2 hours and then placed in a greenhouse at 15°C. After 48 hours, the degree of damage was observed. For the annual plants, the leaves observed were those situated in the lower one-fourth portion of the leaves above the ground. For the trees, the leaves observed were those situated in the lower one-fourth portion of the leaves of the branch tested. The results obtained are shown expressed as Injury Index in the following Table 6.

Table 6

| Name of Plant | Compound Number | | | | | | | | | | | | | un-treated |
|---|---|---|---|---|---|---|---|---|---|---|---|---|---|---|
| | 1 | 2 | 3 | 4 | 5 | 6 | 7 | 8 | 9 | 10 | 11 | 12 | 13 | |
| Tobacco | 0.2 | 0.3 | 0.3 | 0.2 | 0.7 | 0.3 | 0.4 | 0.5 | 0.5 | 0.4 | 0.3 | 0.4 | 0.5 | 4.0 |
| Tomato | 0.2 | 0.5 | 0.6 | 0.5 | 0.7 | 0.5 | 0.3 | 0.3 | 0.3 | 0.3 | 0.3 | 0.2 | 0.4 | 3.8 |
| Egg-plant | 0.4 | 0.3 | 0.2 | 0.2 | 0.6 | 0.4 | 0.3 | 0.4 | 0.4 | 0.4 | 0.5 | 0.3 | 0.2 | 3.8 |
| Kidney Bean | 0.3 | 0.4 | 0.5 | 0.6 | 0.4 | 0.5 | 0.6 | 0.5 | 0.5 | 0.5 | 0.6 | 0.4 | 0.3 | 4.4 |
| Alfalfa | 0.4 | 0.5 | 0.3 | 0.4 | 0.5 | 0.2 | 0.5 | 0.4 | 0.4 | 0.4 | 0.3 | 0.2 | 0.4 | 4.2 |
| Rose | 0.5 | 0.5 | 0.3 | 0.5 | 0.4 | 0.3 | 0.3 | 0.5 | 0.5 | 0.5 | 0.5 | 0.3 | 0.6 | 3.7 |
| Garden Balsam | 0.3 | 0.6 | 0.5 | 0.4 | 0.8 | 0.4 | 0.5 | 0.6 | 0.6 | 0.6 | 0.7 | 0.4 | 0.4 | 3.5 |
| Sage | 0.4 | 0.4 | 0.7 | 0.7 | 0.9 | 0.7 | 0.6 | 0.8 | 0.8 | 0.6 | 0.8 | 0.5 | 0.8 | 4.1 |
| Peach | 0.1 | 0.2 | 0.3 | 0.3 | 0.4 | 0.2 | 0.3 | 0.1 | 0.1 | 0.2 | 0.2 | 0.3 | 0.1 | 1.9 |
| Grape Vine | 0.4 | 0.6 | 0.7 | 0.3 | 0.7 | 0.4 | 0.5 | 0.2 | 0.2 | 0.4 | 0.3 | 0.6 | 0.5 | 1.5 |
| Japanese Cherry | 0.2 | 0.3 | 0.5 | 0.5 | 0.9 | 0.2 | 0.3 | 0.4 | 0.4 | 0.4 | 0.5 | 0.3 | 0.6 | 1.3 |
| Plane Tree | 0.3 | 0.2 | 0.2 | 0.3 | 0.2 | 0.5 | 0.2 | 0.3 | 0.3 | 0.2 | 0.3 | 0.3 | 0.2 | 1.0 |

It is apparent from the results shown in the Table 6 that the protective agents 1 – 8 of this invention show protective effects for oxidant injury for all of the plants tested.

While the invention has been described in detail and with reference to specific embodiments thereof, it will be apparent to one skilled in the art that various changes and modifications can be made therein without departing from the spirit and scope thereof.

What is claimed is:

1. A method of protecting plants against air oxidant injury comprising applying to said plants piperonyl butoxide.

2. The method of claim 1, wherein said compound is applied in the form of an emulsifiable concentrate or a wettable powder.

3. The method of claim 1, wherein said plants are tobacco, tomato, egg-plant, kidney bean, grape vine or rose.

* * * * *